United States Patent [19]
Barron

[11] Patent Number: 5,428,347
[45] Date of Patent: * Jun. 27, 1995

[54] WATER SENSOR SYSTEM

[75] Inventor: Robert C. Barron, Pompano Beach, Fla.

[73] Assignee: LeakGard, Inc., Pompano Beach, Fla.

[*] Notice: The portion of the term of this patent subsequent to Jan. 22, 2008 has been disclaimed.

[21] Appl. No.: 3,139

[22] Filed: Jan. 12, 1993

[51] Int. Cl.$^6$ .............................................. G08B 21/00
[52] U.S. Cl. ...................................... 340/604; 340/605; 340/618; 340/620; 200/61.04
[58] Field of Search ............... 340/604, 605, 618, 620; 200/61.04

[56] References Cited

U.S. PATENT DOCUMENTS

| | | | |
|---|---|---|---|
| 3,473,553 | 12/1969 | Collins | 200/61.04 |
| 4,787,212 | 11/1988 | Hessey | 340/604 |
| 4,789,853 | 12/1988 | Gentiluomo | 340/604 |
| 4,796,658 | 1/1989 | Caple | 340/620 |
| 4,805,662 | 2/1989 | Moody | 340/625 |
| 4,845,472 | 7/1989 | Gordon et al. | 340/604 |
| 4,987,408 | 1/1991 | Barron | 340/618 |
| 5,229,750 | 7/1993 | Welch, Jr. et al. | 340/605 |

Primary Examiner—John K. Peng
Assistant Examiner—Edward Lefkowitz
Attorney, Agent, or Firm—Malin, Haley, DiMaggio & Crosby

[57] ABSTRACT

An improved water sensor unit wherein a plurality of water-related appliances or equipment can be simultaneously monitored and, in the event of sensing water with respect to any one of the several items being monitored, appropriate action is taken, such as shutting off the power to the unit and simultaneously shutting off the water supply to that particular unit. The sensor unit comprises a plurality of electronic circuits which include thermal circuit breakers acting as a "fault memory." When a fault occurs, the circuit breakers are tripped. Thus, the fault condition will be "remembered" indefinitely until human intervention.

19 Claims, 4 Drawing Sheets

WATER SENSOR SYSTEM

BACKGROUND OF THE INVENTION

1. Field of the Invention

This invention is an improvement to my now issued U.S. Pat. No. 4,987,408. The invention relates to the detection of leakage water around household appliances. More specifically, it relates to the detection of leakage water around appliances such as air conditioning units, a hot water heater, or a clothes washing machine, and the subsequent shutting off of power and water to the appliances in response thereto.

2. Description of the Prior Art

Due to the absence of homeowners for a considerable amount of time each day, and also the fact that most multi-storied apartment buildings have many household units with each unit usually having at least three appliances which use or generate water and are subject to leakage and/or internal electrical short circuits for any one of a variety of reasons, there is a great need for water sensor systems which will monitor these various water-related appliances and respond to protect the appliance, the property, and any person that may come in contact with the appliance.

There are known systems which utilize a water collecting tray under a water appliance, such as a washing machine. An example of such a prior art device is disclosed in Thomas W. Collins' U.S. Pat. No. 3,473,553, issued on Oct. 21, 1969. In the Collins patent, a float-actuated electrical switch closes an electrical circuit when sufficient water collects in a tray. A plunger is depressed to open a normally closed valve, and a latch pin is used to hold the valve in the open position. The pin is retracted by means of a solenoid, thus permitting the valve to be closed by a spring.

Devices such as the above-described apparatus have not met with wide consumer acceptance. The main reason being due to the fact that there has to be a considerable amount of water leakage before the float will activate the switch. In some instances, the float has become inoperative due to the various deposits in the water, which cause sticking of the linkage, therefore resulting in flooding of the apartment, home or laundry room during the absence of the household occupants.

In my now issued U.S. Pat. No. 4,987,408, when water is sensed, the normally closed circuit opens, allowing storage capacitors to discharge and disable the respective operation associated with the leak. Once shut off, the controlled device cannot be turned on until the control circuit is manually reset. The storage capacitors will "remember" a fault even during a power failure. However, the problem with the capacitors is that they are only good for remembering a fault for approximately 500 hours of down time.

SUMMARY OF THE INVENTION

In view of the known inadequacies of prior art devices such as the ones described above, Applicant has been motivated to develop an improved safety system which has eliminated these deficiencies.

Accordingly, Applicant has designed an improved, new and novel water sensor unit, wherein a plurality of water-related functions can be simultaneously monitored and in the event of sensing the presence of water with respect to any one of the several appliances being monitored, appropriate action is taken, such as shutting off the power to the unit and simultaneously shutting off the water supply to that particular unit. The improved water sensor system utilizes thermal circuit breakers for fault memory. When a fault occurs, the circuit breakers are tripped. Thus, the fault condition will be "remembered" indefinitely until human intervention. This improves the reliability of the fault memory while adding additional protection to the 24 volt water control valve circuits as a bonus.

The instant device also allows isolated external control of a high power appliance from a low power source. This provides compatibility with public utility power management systems now being installed by some power companies.

The safety unit plugs into a standard hot water heater outlet. The hot water heater in turn plugs into a receptacle on the safety unit. Power through the unit is controlled by two triacs, one on each side of the 240 volt AC line. A pilot lamp indicates the presence of 240 volts at the receptacle. Control of one or two water solenoids is an available feature.

With respect to the safety features, the electronics of the unit are fused from the 240 volt line. An alarm will sound if the fuse blows. The use of two triacs assures that both sides of the 240 volt line are shut off, thus increasing safety to any person coming in contact with the appliance. The triacs will not stay on unless both triacs are on. However, the pilot lamp will indicate power in the event that one triac has shorted out, i.e., if 120 volts to ground was present through such a failure. Additional safety features include the placement of all high voltage circuits on one board beneath a metal panel. All connections from this board to the control board are isolated through optical isolators (7500 volts isolation). Additional features of the water sensor unit will be discussed later in the specification.

In accordance with the instant invention, it is a principle object thereof to provide a water sensor unit which will remember a fault indefinitely until human intervention.

A further object of the invention is to provide a water sensor unit which utilizes electronic components which are not subject to the deficiencies of mechanical components.

A further object of the invention is to provide a water sensor unit which is quick to respond to the presence of water.

Yet another object of the invention is to provide a water sensor unit which can sense the presence of water around a plurality of water-related appliances.

A still further object of the invention is to provide a water sensor unit which can control both the supply of water and power to a unit.

Another object of the invention is to provide a water sensor unit which includes both pilot indicator lamps and an audible alarm.

In accordance with these and other objects which will be apparent hereinafter, the instant invention will now become described with particular reference to the accompanying drawings.

DESCRIPTION OF THE PREFERRED EMBODIMENTS

Figure 1:
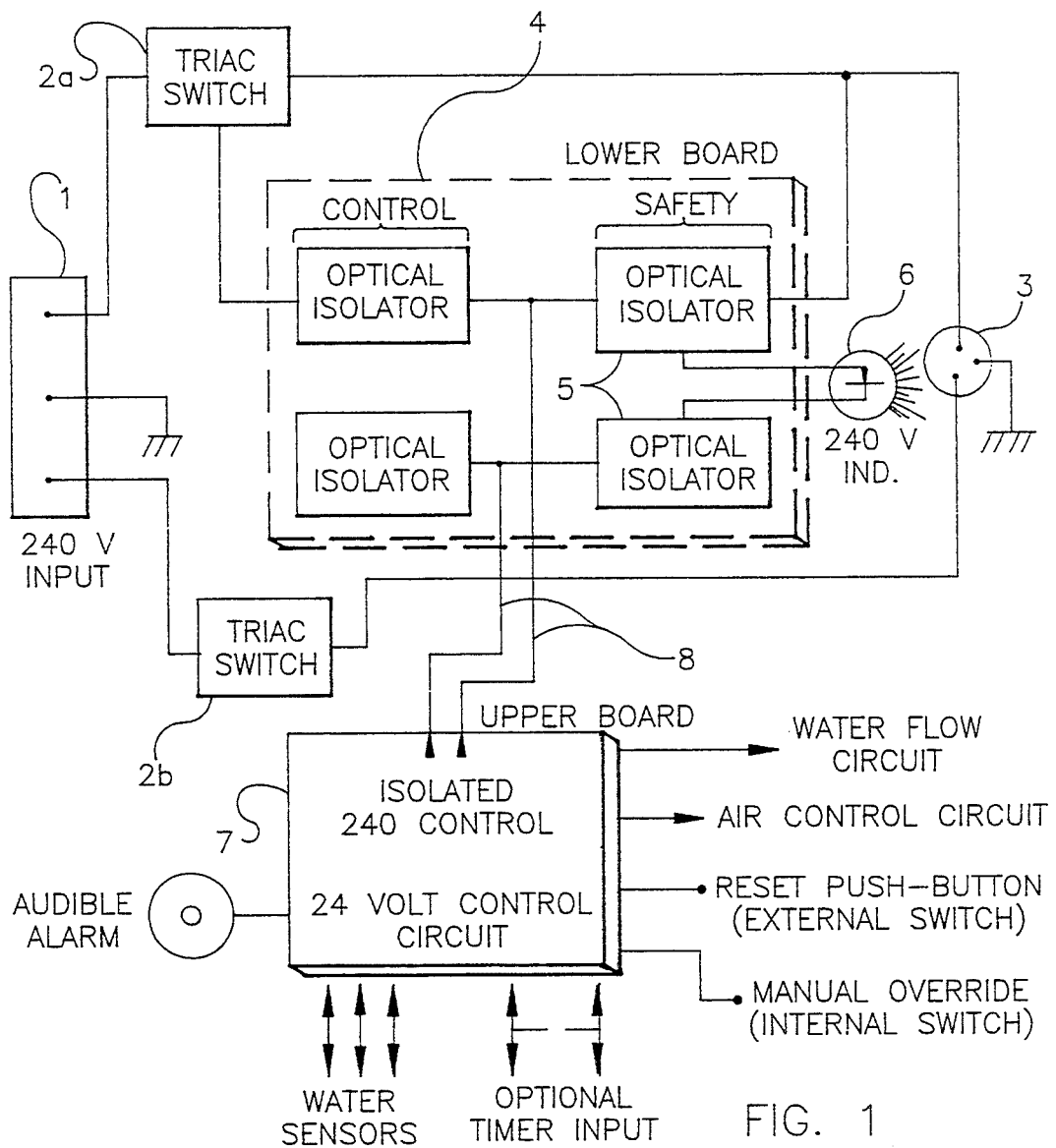
FIG. 1 is a block diagram of the entire water sensor unit's control circuitry.

Referring now to FIG. 1, the major components of the water detector system are shown in the form of a block diagram. Input power for the system is provided by plug 1, which is connected to a 240 volt AC receptacle (not shown), usually the one provided for the electric water heater. Each side of the input line is connected to a triac 2a, 2b, and from the triacs to both the outlet receptacle 3 and to the lower board 4. The lower board includes optical isolator circuitry 5a, 5b, 5c and a pilot indicator lamp 6, as well as additional circuitry, all of which will be discussed in more detail below.

Isolated 24-volt AC and 5 vdc power is provided from the lower board 4 to the upper board 7 over lines 8a and 8b. The upper board performs all of the control functions of the system while operating at a safe voltage level for consumer protection. All of the water sensors and various control circuits for the water detector system, including an external alarm and optional timer, are connected to the low voltage upper board, and are completely isolated from the 240 volt supply.

In operation, the water detector system is connected to a 240 volt source through plug 1, and the electric hot water heater is connected to outlet 3. The triac switches 2a and 2b operate in conjunction with the optical isolators 5a, 5b, and 5c to control power to the hot water heater. If only one side of the 240 volt line is present, both triacs will be shut off by the operation of optical isolator 5c. Other control functions, such as ground fault sensing, are discussed below.

Figure 2:
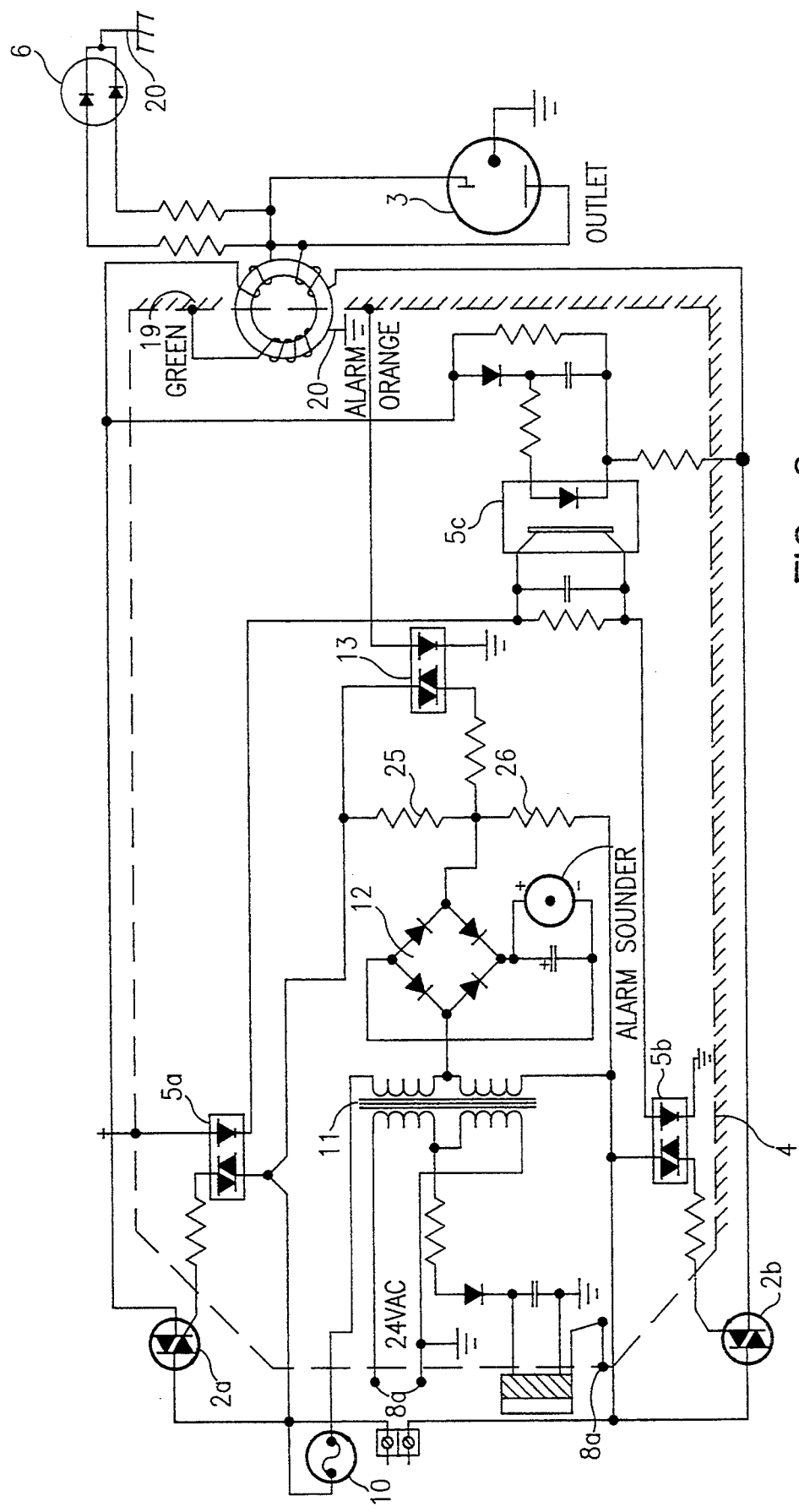
FIG. 2 is a diagram illustrating the electronic circuitry used in the lower board and chassis of the water sensor unit.

The internal circuitry of the lower board is shown in detail in FIG. 2. The 240 volt input from plug 1 is connected through triac switches 2a and 2b and saturable torroid 9 to outlet 3, into which the electric hot water heater is plugged. The 240 volt input is also connected through fuse 10 to the primary side of transformer 11. The 240 volts is also connected across resistors 25 and 26.

Normally bridge rectifier 12 has no AC input since the voltage at the center of the two resistors is the same as that at the center tap of transformer 11. If the fuse 10 blows or optical isolator 13 is activated by a fault signal from the upper board, then an unbalanced condition is created which presents AC voltage at bridge rectifier 12 to power the alarm sounder.

The 240 volt output is controlled from upper control board 7 through optical isolators 5a, 5b and 5c, with connections to the upper board at terminals 16 and 17.

Hot water heaters are prone to ground faults which may cause runaway heating due to loss of control of the normal thermostat. In the instant invention, ground fault in the hot water heater connected to output 3 will be sensed in the saturable torroid 9 by a change in the magnetic flux due to a change in current through the windings of the power circuit to the outlet 3. Auxiliary winding 18 will sense the change in magnetic flux due to a fault condition and provide a signal to the upper board 7 through terminals 19 and 20.

Figure 3:
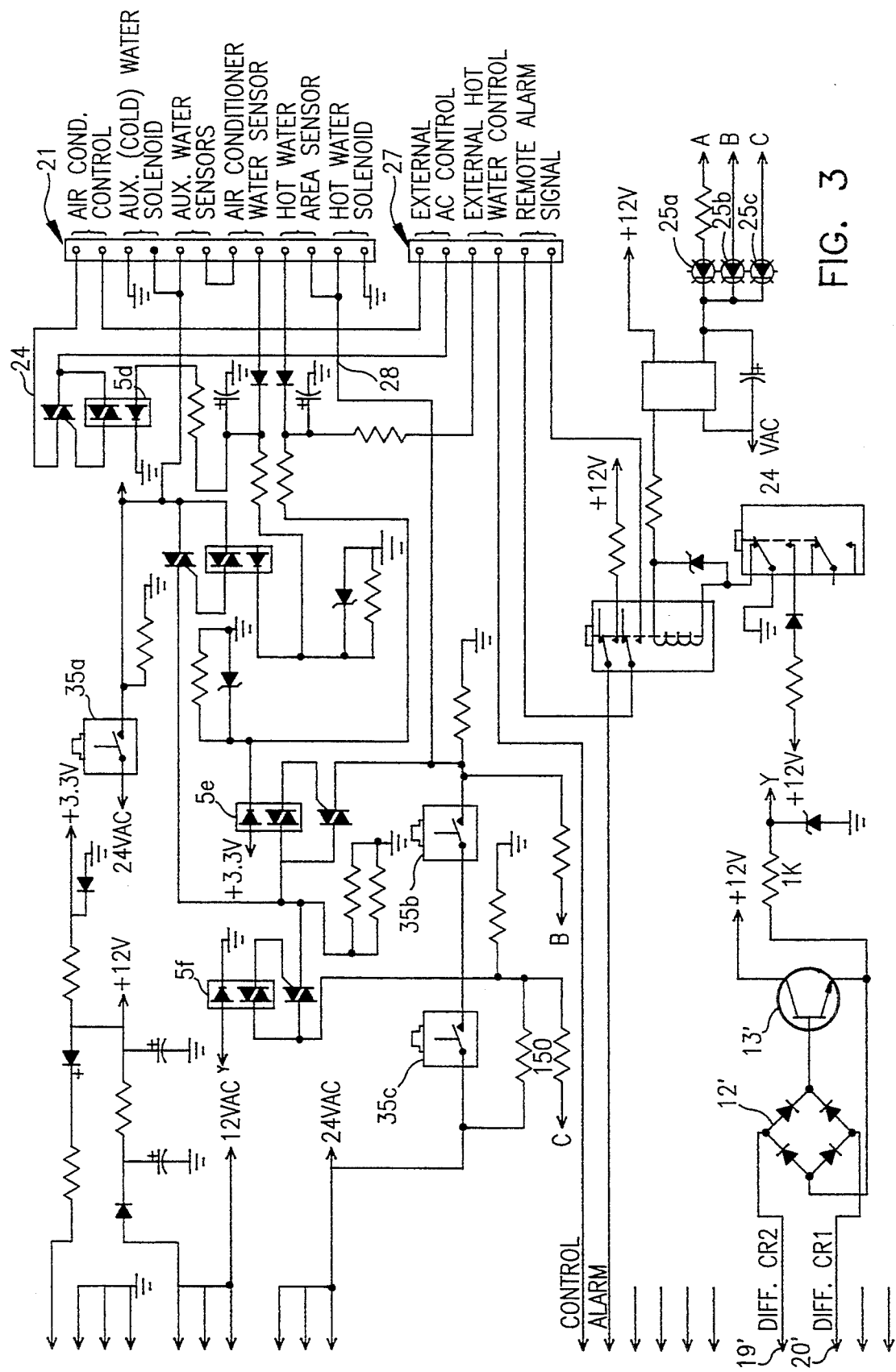
FIG. 3 is a diagram illustrating the electronic circuitry used in the upper control board.

Referring now to FIG. 3, the circuitry of the upper board 7 will now be discussed. The power for the control board is applied on lines 8 from the lower board 4. Water sensors are connected to terminal block 21 as indicated. These sensors are normally closed circuits, and are operated on alternating current to reduce connection deterioration present with direct current. When water is sensed, the circuit opens, allowing the optical isolator to become operable, blowing the circuit breaker, and disabling the respective electrical circuit associated with the detection of the leak. For instance, if the air conditioner water sensor connected to terminal block 21 is tripped, optical isolator 5d becomes operable, blowing circuit breaker 35a, triggering alarm input A, air conditioner control circuit 24, and fault indicator lamp 25a. Once shut off, the controlled device cannot be turned on until the control circuit is manually reset. Circuit breakers 35a, 35b and 35c will "remember" the status of the circuit or a fault, even during a power failure, indefinitely.

Similar operation is provided from the water heater and miscellaneous water alarms. Water sensed will open the normally closed circuit, causing optical isolator 5e to become operable, blowing circuit breaker 35b, triggering alarm input B, fault indicator lamp 25b, and water solenoid control circuit 28.

As shown in FIG. 3, a separate signal may also be provided to the optional external hot water control which will trip the triac switches 2a and 2b on the lower board 4 and disconnect power to the hot water heater.

The ground fault signal developed by the auxiliary winding 18 of saturable torroid 9 on lower board 4 is hardwired from terminals 19 and 20 on the lower board 4 to inputs 19' and 20' on the upper board 7. If there is no ground fault—if the current through the two 220 lines is identical, there is no pulse on inputs 19' and 20'. If there is a ground fault, then an unbalanced condition is created which presents AC voltage at bridge rectifier 12', closing the drain-to-gate connection and turning on MOSFET 13', causing input Y to operate optical isolator 5f, blowing circuit breaker 35c, triggering alarm input C, fault indicator lamp 25c, and causing triac switches 2a and 2b to disconnect power to the hot water heater outlet 3, and triggering the water solenoid control circuit 28.

The alarm inputs A, B, C may be used to trigger an external audible alarm as shown in FIG. 1. The alarm may be connected to terminal block 27 as indicated in FIG. 3.

Figure 4:
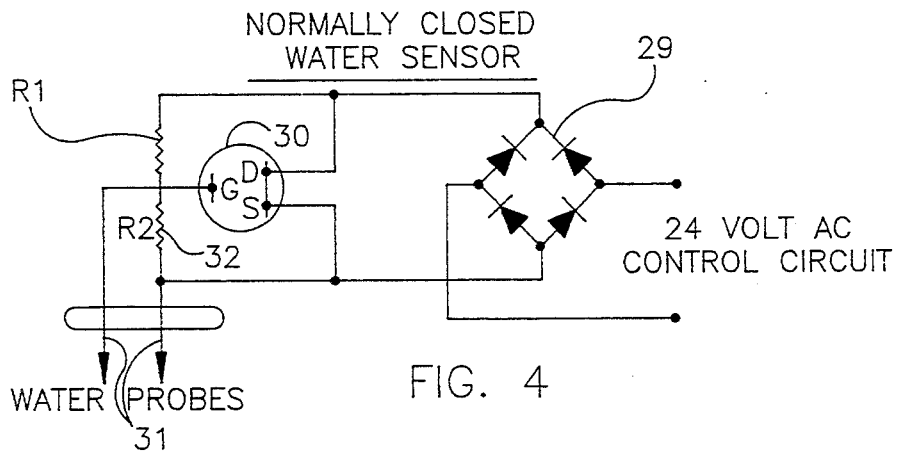
FIG. 4 is an illustration of the circuit for a normally closed water sensor.

FIG. 4 illustrates the type of normally closed water sensor which may connect to terminal block 21. Sensing of water by probes 31 will short the source and gate electrodes, effectively eliminating resistor 32 and triggering the detector system by turning off MOSFET 30.

Figure 5:
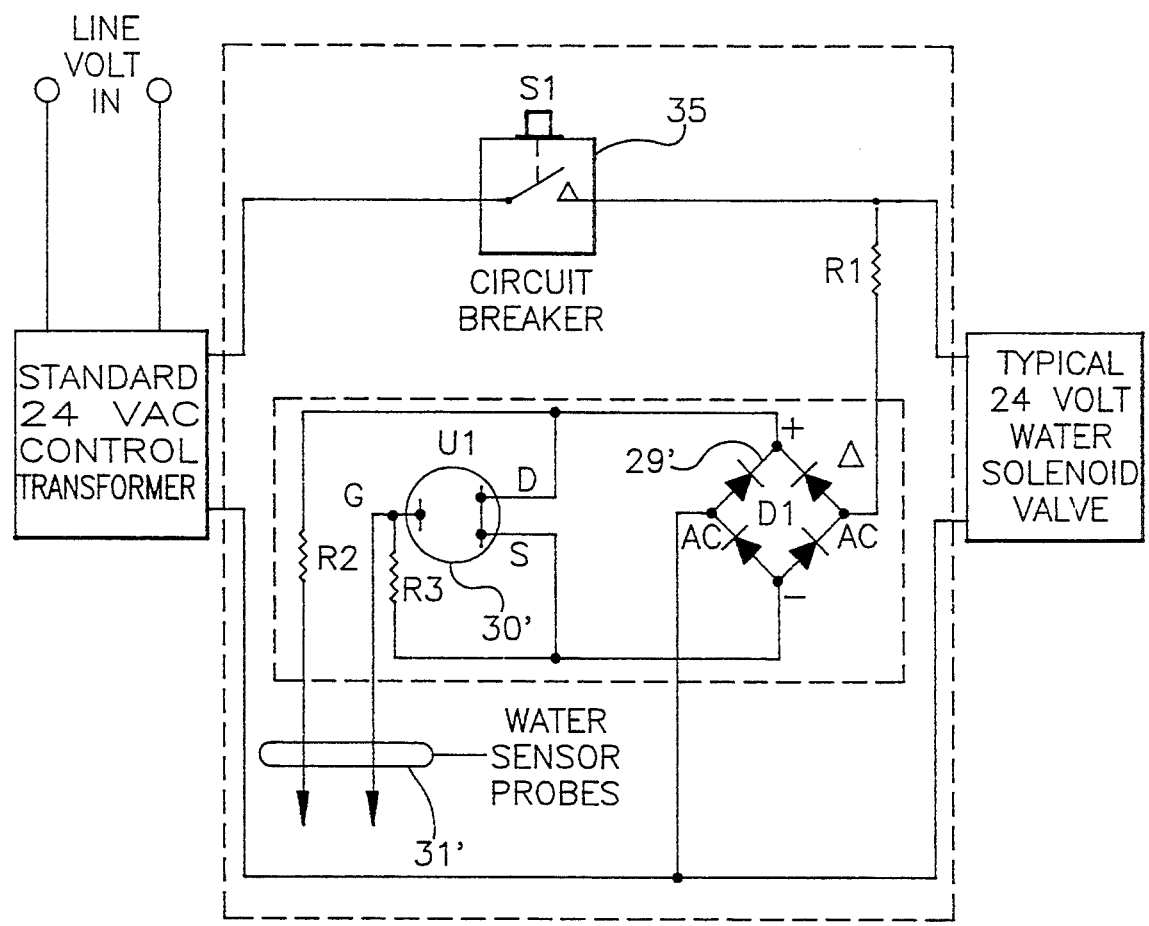
FIG. 5 is an illustration of the circuit for a normally open water sensor.

FIG. 5 illustrates a type of normally open water sensor capable of being used as a stand alone device to shut the water supply off and leave it off until someone walks over and puts it back on again. As shown, the water sensor may be placed between a transformer and a solenoid valve. Sensing of water by probes 31' closes the drain-to-gate connection and turns on MOSFET 30'. When MOSFET 30' turns on, it shorts out bridge 29', which pulls more current through circuit breaker 35 than it can handle, causing circuit breaker 35 to blow. Therefore, even if the water dries up, the fault is remembered indefinitely and the water supply will not be "reset" or turned on until there is human intervention.

Thus, it is apparent that activation of any of the water sensors connected to terminal block 21 will cause operation of the appropriate optical isolator, blowing of the appropriate circuit breaker, activation of the audible alarm, lighting of the appropriate indicator lamp, and initiation of the appropriate control circuitry, whether it is to shut off the air conditioner, shut off the water supply, or terminate power to the hot water heater. Likewise, sensing of a ground fault condition in the hot water heater will operate an optical isolator, blow a circuit breaker, trigger an alarm, light an indicator lamp, and disconnect power and water to the hot water heater.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A water detector system for the detection of standing water indicative of an abnormal condition in a building or other habitable structure, said system comprising:
   (a) a power circuit having an input to be connected to a source of alternating current, and an output to which is connected an electrical appliance to be protected, said power circuit having at least two electrically conducting leads, said electrically conducting leads connected at one end to said input, and at their respective other ends to said output, said electrical appliance receiving its electrical power through said leads of said power circuit;
   (b) a lower circuit board connected to said power circuit comprising
      (i) means for interrupting the electrical circuit between said input and said output of said power circuit when a fault is detected by said system thus disconnecting the electrical appliance from the source of alternating current;
      (ii) means for controlling said means for interrupting;
      (iii) means for electrically isolating said means for interrupting from said means for controlling;
      (iv) means for sounding an alarm in response to conditions that would engage said means for interrupting;
   (c) an upper circuit board comprising
      (i) means for connecting said upper circuit board to said lower circuit board, said means for connecting electrically isolating said upper circuit board from said lower circuit board;
      (ii) means for initiating alarm signals responsive to the detection of standing water, said alarm signals being passed to said means for sounding an alarm on said lower circuit board through said means for connecting said upper circuit board to said lower circuit board;
      (iii) means for initiating control signals responsive to the detection of standing water, said control signals being passed to said means for controlling said means for interrupting through said means for connecting said upper circuit board to said lower circuit board;
      (iv) means for passing said control signals from said upper circuit board to external control devices, whereby the external control devices, in response to said control signals, perform functions responsive to the detection of standing water, including disconnecting said electrical appliance from said source of alternating current;
   (d) means for sensing water connected to said upper circuit board for generating water detection signals for initiating said alarm signals and said control signals;
   (e) means for preventing said electrical appliance from reconnecting to said source of alternating current until said means for preventing is manually reset thus resetting said means for interrupting; and
   (f) means for initiating alarm signals and control signals in response to a blown fuse.

2. A water detector system as claimed in claim 1, wherein said means for interrupting the electrical circuit between said input and said output of said power circuit includes a triac switch means connected between said input and said output, said triac switch means controlled by said means for controlling said means for interrupting.

3. A water detector system as claimed in claim 1, wherein said means for electrically isolating said means for interrupting from said means for controlling includes light emitting diodes and associated photo transistors placed between said power circuit and said means for controlling said means for interrupting.

4. A water detector system as claimed in claim 1, in which said means for sensing water include:
   (a) means for converting alternating current provided from said means for electrically isolating to direct current;
   (b) means for providing a continuous electrical current path only in the presence of standing water, whereby said standing water becomes an integral, electrically conducting element of said continuous electrical current path, said standing water thereby electrically completing said continuous electrical current path; and
   (c) means for communicating the presence of said continuous electrical current path to each of said means for initiating alarm signals and control signals.

5. A water detector system as claimed in claim 4, in which said means for providing a continuous electrical current patch includes two spaced apart water probes; wherein said means for converting alternating current to direct current includes a full wave diode rectifier positioned across the drain and source of a field effect transistor, said full wave diode rectifier electrically connected to said means for electrically isolating; and wherein said means for providing a continuous electrical current path also includes two resistors operating as a voltage divider biasing the gate of said field effect transistor, causing said field effect transistor to conduct electrical current from said drain to said source in the absence of water between said water probes, each of said water probes respectively electrically connected to each side of said resistor positioned between said gate and said source of said field effect transistor so that an electrical circuit containing said water probes is in parallel with said resistor positioned between said gate and said source, whereby the presence of water between said water probes dissipates the bias of said gate of said field effect transistor, thereby shutting off said field effect transistor, whereby in the presence of water between said water probes, the only electrical current flowing through said water sensor flows through said resistor positioned between said drain and said gate and through said water probes and the water therebetween, which electrical current flows in a reduced amount in comparison to the electrical current flowing through said water sensor means in the absence of water between said water probes.

6. A water detector system as claimed in claim 5, wherein said means for communicating the presence of said continuous electrical current path to said means for initiating alarm signals and control signals includes means for detecting the reduction in electrical current flowing through said water sensors in response to water present between said water probes.

7. A water detector system as claimed in claim 2, which includes means for sensing a ground fault in said power circuit or said electrical appliance and activating said means for interrupting the electrical circuit between said input and said output of said power circuit, thereby disconnecting said protected appliance from said source of alternating current.

8. A water detector system as claimed in claim 1, wherein said means for preventing is a circuit breaker.

9. A water detector system for the detection of standing water indicative of an abnormal condition in a building or other habitable structure, said system comprising:

(a) a power circuit having an input connected to a source of alternating current and an output to which is connected an electrical appliance to be protected, said power circuit having at least two electrically conducting leads, said electrically conducting leads connected at one end to said input, and at their respective other ends to said output, said electrical appliance receiving its electrical power through said leads of said power circuit, said power circuit having a triac switch means connected to each of said electrically conducting leads, whereby the flow of electrical current through said electrically conducting leads is controlled by the operation of said triac switch means;

(b) a lower circuit board connected to said triac switch means and said output, said lower circuit board including optical isolator control means for controlling each of said triac switch means, a low voltage power supply connected between said electrically conducting leads of said power circuit, an alarm enable circuit, said alarm enable circuit including optical isolator control means for controlling said alarm enable circuit and for electrically isolating said alarm circuit from said power circuit;

(c) an upper circuit board powered by said low voltage power supply on said lower circuit board, said upper circuit board including a plurality of water sensors and associated circuitry for detecting standing water and generating a control signal at said sensors, whereby said control signal enables said alarm circuit, activates said alarm circuit optical isolator means, causes a circuit breaker connected to said alarm circuit optical isolator means to blow, whereby when said circuit breaker blows, it causes said triac switch means to discontinue the flow of electrical current through said leads, thereby protecting said electrical appliance from electrically-related damage and alerting persons near said electrically protected device to the presence of the standing water condition, whereby when said circuit breaker blows the electrical appliance is disconnected from the source of alternating current until said circuit breaker is manually reset thus resetting said triac switch means; and (d) means for initiating alarm signals and control signals in response to a blown fuse.

10. A water detector system as claimed in claim 9, further comprising means for disconnecting the water supply to said electrical appliance in response to said control signal.

11. A water detector system as claimed in claim 9, which includes means for sensing a ground fault in said power circuit or said electrical appliance and initiating a control signal which causes said triac switch means to electrically disconnect said appliance from said source of alternating current.

12. A water detector system as claimed in claim 11, in which, once a ground fault has been sensed and alarm and control action has been taken, normal operation of said water detector system may not be restored except by manual resetting of the control circuits involved.

13. A water detector and cutoff system for detecting the presence of moisture in the immediate vicinity of a water consuming appliance and cutting off the supply of power and water thereto, said system comprising:

(a) a power circuit having an input to be connected to a source of alternating current, and an output to which is connected an electrical appliance to be protected, said power circuit having at least two electrically conducting leads, said electrically conducting leads connected at one end to said input, and at their respective other ends to said output, said electrical appliance receiving its electrical power through said leads of said power circuit;

(b) a lower circuit board connected to said power circuit comprising
  (i) means for interrupting the electrical circuit between said input and said output of said power circuit when a fault is detected by said system thus disconnecting the electrical appliance from the source of alternating current;
  (ii) means for controlling said means for interrupting;
  (iii) means for electrically isolating said means for interrupting from said means for controlling; and
  (iv) means for sounding an alarm in response to conditions that would engage said means for interrupting;

(c) an upper circuit board comprising
  (i) means for connecting said upper circuit board to said lower circuit board, said means for connecting electrically isolating said upper circuit board from said lower circuit board;
  (ii) means for initiating alarm signals responsive to the presence of moisture, said alarm signals being passed to said means for sounding an alarm on said lower circuit board through said means for connecting said upper circuit board to said lower circuit board;
  (iii) means for initiating control signals responsive to the presence of moisture, said control signals being passed to said means for controlling said means for interrupting through said means for connecting said upper circuit board to said lower circuit board;
  (iv) means for passing said control signals from said upper circuit board to external control devices, whereby the external control devices, in response to said control signals, perform functions responsive to the presence of moisture, including the closing of a solenoid to shut off a water supply; and
  (v) means for turning off the supply of water to the appliance in response to said control signals;

(d) a plurality of water sensors connected to said upper circuit board for generating water defection signals for initiating said alarm signals and said control signals;

(e) means for preventing said electrical appliance from reconnecting to said source of alternating current until said means for preventing is manually reset thus resetting said means for interrupting; and (f) means for initiating alarm signals and control signals in response to a blown fuse.

14. A water detector and cutoff system as claimed in claim 13, wherein said means for controlling said means for interrupting includes isolating means for electrically isolating said means for interrupting from said means for controlling for protection of personnel from said source of alternating current.

15. A water detector and cutoff system as claimed in claim 13, wherein the connection to said lower circuit board for passing alarm signals and control signals initiated on said upper circuit board is through said isolating means.

16. A water detector and cutoff system as claimed in claim 13, wherein said water detection signal activates an audible alarm.

17. A water detector and cutoff system as claimed in claim 13, wherein said water detection signal activates an audible and visual alarm.

18. A water detector and cutoff system as claimed in claim 13, wherein said means for preventing is a circuit breaker.

19. A water detection device for turning off the supply of water to a water consuming appliance comprising:

means for sensing water, said means for sensing water electrically connected between a transformer and a solenoid valve, said means for sensing water including two spaced apart water probes, a full wave diode rectifier positioned across the drain and source of a field effect transistor, said full wave diode rectifier electrically connected between said transformer and said solenoid valve, wherein said means for sensing water also includes two resistors positioned so as to bias the gate of said field effect transistor between the drain and gate of said field effect transistor, to turn on said field effect transistor in the event of the presence of water between said water probes, said water probes electrically connected in series with said resistor, positioned between said gate and said drain, said water probes and the water therebetween being integral electrically conducting elements of the circuit between said gate and said drain of said field effect transistor, said means for sensing water further including a circuit breaker, said circuit breaker electrically connected between said transformer and said solenoid valve, and a resistor electrically connected between said circuit breaker and said rectifier, whereby the sensing of water by said probes closes the drain to gate connection, causing said field effect transistor to turn on, thereby shorting out said full wave diode rectifier, causing said circuit breaker to blow whereby when said circuit breaker blows electrical communication between said transformer and said solenoid valve is disconnected thus cutting off the supply of water to the water consuming appliance until said circuit breaker is manually reset, said means for sensing water acting as a normally open switch.

* * * * *